(12) United States Patent
Han et al.

(10) Patent No.: US 10,732,045 B2
(45) Date of Patent: Aug. 4, 2020

(54) APPARATUS FOR ACQUIRING IMAGE USING TERAHERTZ WAVE

(71) Applicant: Electronics and Telecommunications Research Institute, Daejeon (KR)

(72) Inventors: Sang-Pil Han, Daejeon (KR); Jun Hwan Shin, Seoul (KR); Il Min Lee, Daejeon (KR); Kyung Hyun Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 101 days.

(21) Appl. No.: 16/122,486

(22) Filed: Sep. 5, 2018

(65) Prior Publication Data

US 2019/0285475 A1 Sep. 19, 2019

(30) Foreign Application Priority Data

Mar. 16, 2018 (KR) .................. 10-2018-0030826

(51) Int. Cl.
| | |
|---|---|
| *G01J 3/453* | (2006.01) |
| *G02B 27/14* | (2006.01) |
| *G01J 3/06* | (2006.01) |
| *G02B 5/02* | (2006.01) |

(52) U.S. Cl.
CPC .............. *G01J 3/4535* (2013.01); *G01J 3/06* (2013.01); *G02B 5/0205* (2013.01); *G02B 27/14* (2013.01)

(58) Field of Classification Search
CPC ........ G01J 3/06; G01J 3/4535; G02B 5/0205; G02B 27/14
See application file for complete search history.

(56) References Cited

U.S. PATENT DOCUMENTS

| | | | |
|---|---|---|---|
| 8,129,684 B2 | 3/2012 | Mueller | |
| 2007/0263226 A1* | 11/2007 | Kurtz | A61B 5/0059 356/492 |
| 2011/0149068 A1 | 6/2011 | Son et al. | |
| 2012/0112230 A1 | 5/2012 | Jun et al. | |
| 2013/0120740 A1* | 5/2013 | Schonleber | B23K 26/032 356/72 |
| 2013/0146770 A1 | 6/2013 | Jun et al. | |
| 2013/0338479 A1* | 12/2013 | Pogue | A61B 5/0059 600/408 |

(Continued)

FOREIGN PATENT DOCUMENTS

| | | |
|---|---|---|
| EP | 3156762 A1 | 4/2017 |
| KR | 101322833 B1 | 10/2013 |

OTHER PUBLICATIONS

Gao, Long et al. "High-Speed Scanning Fiber-Optic Heterodyne Interferometer Using a Micro-Electro-Mechanical System Mirror and an f-theta Lens". Optical Review, vol. 18, No. 6, 2011, pp. 455-457. (Year: 2011).*

(Continued)

*Primary Examiner* — Michael A Lyons
(74) *Attorney, Agent, or Firm* — William Park & Associates Ltd.

(57) ABSTRACT

An image acquisition apparatus including a beam source, a beam expander, a beam splitter, an interferometer reference arm, a sample, a beam diffuser, a telecentric f-θ lens, a beam scanner, and a beam detector uses a terahertz wave to acquire a surface image and a depth image of the sample.

15 Claims, 10 Drawing Sheets

(56) References Cited

U.S. PATENT DOCUMENTS

2014/0362384 A1* 12/2014 Gorschboth .......... G01J 3/2803
                                                356/451
2016/0231472 A1*  8/2016 Murgai ................ G02B 5/0278
2017/0007150 A1   1/2017 Jeon et al.
2017/0067821 A1*  3/2017 Giles .................. G01B 9/02044
2017/0102231 A1*  4/2017 Yahng ................... G01B 11/24

OTHER PUBLICATIONS

Lee, Eui Su et al. "Semiconductor-Based Terahertz Photonics for Industrial Applications". Journal of Lightwave Technology, vol. 36, No. 2, Jan. 15, 2018, pp. 274-283. (Year: 2018).*

Gyeongsik Ok et al., "High-performance sub-terahertz transmission imaging system for food inspection", 2015, Biomed. Opt. Express, pp. 1929-1941, vol. 6, issue 5, USA.

Stefan Katletz et al., "Efficient terahertz en-face imaging", 2011, Opt. Express, pp. 23042-23053, vol. 19, Issue 23, USA.

* cited by examiner

APPARATUS FOR ACQUIRING IMAGE USING TERAHERTZ WAVE

CROSS-REFERENCE TO RELATED APPLICATION(S)

This application claims the benefit of Korean Patent Application No. 10-2018-0030826, filed on Mar. 16, 2018, in the Korean Intellectual Property Office, the disclosure of which is incorporated herein by reference.

BACKGROUND

1. Field of the Invention

One or more example embodiments relate to an apparatus for acquiring an image using a terahertz wave, and more particularly, an apparatus for acquiring a depth image of a sample as well as a surface image of the sample.

2. Description of the Related Art

Terahertz waves in a frequency range of 100 gigahertz (GHz) to 10 terahertz (THz) exist in a boundary of a light wave and a radio wave and have been developed as a new electromagnetic wave technology employing the latest laser technology and a semiconductor technology, to pioneer a terahertz frequency band that and is technically developed belatedly.

Terahertz waves have both directivity and properties of penetrating non-conductive materials. Unlike X-rays that ionize atoms or molecules of a material, a terahertz wave has energy of about 4 mili-electron volt (4 meV), and has a non-ionizing characteristic for preventing a material from being destroyed. Thus, terahertz waves do not have an influence on human bodies, foods or materials even though terahertz waves are propagated to human bodies, foods or materials, and accordingly may be used to acquire images of human bodies, foods or materials.

SUMMARY

Example embodiments provide an apparatus for acquiring a depth image and a surface image of a sample using a terahertz wave that does not have an influence on the sample.

Example embodiments provide an apparatus for acquiring a depth image of a sample from which the terahertz wave is reflected, using a terahertz wave, by adjusting a depth of the sample using a reference arm of a Michelson interferometer.

Example embodiments provide an apparatus for acquiring an image using a terahertz wave by receiving a terahertz wave including a depth image and a surface image of a sample using a beam scanner.

According to an aspect, there is provided an apparatus for acquiring an image, the apparatus including a beam source configured to generate a terahertz wave, a beam expander configured to expand an angle of the terahertz wave output from the beam source, a beam splitter configured to adjust a direction in which the terahertz wave travels, the beam splitter being located in a position at which terahertz waves transmitted through the beam expander intersect, a beam diffuser configured to receive a terahertz wave from the beam splitter that receives a terahertz wave corresponding to the terahertz wave that travels in the adjusted direction and that is reflected from a sample, and configured to output a diffused terahertz wave, a telecentric f-θ lens configured to determine a focal point of the terahertz wave diffused by the beam diffuser, a beam scanner configured to reflect and scan the terahertz wave transmitted through the telecentric f-θ lens, and a beam detector configured to detect the terahertz wave reflected by the beam scanner, to acquire an image of the sample.

The beam splitter may be configured to divide the direction in which the terahertz wave travels into a direction of a sample and a direction of the Michelson interferometer reference arm. The Michelson interferometer reference arm may be configured to adjust a depth of the sample from which the terahertz wave is reflected so that a depth image of the sample is acquired.

The Michelson interferometer reference arm may be configured to adjust, using at least one lens, a mirror and a stage, the depth of the sample from which the terahertz wave is reflected.

The Michelson interferometer may be configured to adjust, using at least one lens, a mirror and a stage, the depth of the sample from which the terahertz wave is reflected.

The beam diffuser may be configured to adjust, using a lens, beams with the received terahertz wave to be collimated, and to output a terahertz wave diffused by a nanoparticle and a structure that are included in the lens.

The apparatus may further include a lens located between the sample and the beam splitter. A direction in which the terahertz wave travels from the beam splitter to the sample may be changed by the lens so that beams with the terahertz wave may be collimated.

According to another aspect, there is provided an apparatus for acquiring an image, the apparatus including a beam source configured to generate a terahertz wave, a beam expander configured to expand an angle of the terahertz wave output from the beam source, a lens configured to change a direction in which the terahertz wave transmitted through the beam expander travels so that beams with the terahertz wave are collimated, a beam splitter configured to adjust a direction in which the terahertz wave transmitted through the lens travels, a beam diffuser configured to receive a terahertz wave from the beam splitter that receives a terahertz wave corresponding to the terahertz wave that travels in the adjusted direction and that is reflected from a sample, and configured to output a diffused terahertz wave, a telecentric f-θ lens configured to determine a focal point of the terahertz wave diffused by the beam diffuser, a beam scanner configured to reflect and scan the terahertz wave transmitted through the telecentric f-θ lens, and a beam detector configured to detect the terahertz wave reflected by the beam scanner, to acquire an image of the sample.

The beam splitter may be configured to divide the direction in which the terahertz wave travels into a direction of a sample and a direction of the Michelson interferometer reference arm. The Michelson interferometer reference arm may be configured to adjust a depth of the sample from which the terahertz wave is reflected so that a depth image of the sample is acquired.

The Michelson interferometer reference arm may be configured to adjust, using at least one mirror and a stage, the depth of the sample from which the terahertz wave is reflected.

The beam diffuser may be configured to receive the terahertz wave from the beam splitter using a plate, and to output a terahertz wave diffused by a nanoparticle and a structure that are included in the plate.

The beam detector may be configured to receive, using at least one lens, the terahertz wave reflected by the beam scanner.

According to another aspect, there is provided an apparatus for acquiring an image, the apparatus including a beam source configured to generate a terahertz wave, a beam expander configured to expand an angle of the terahertz wave output from the beam source, a beam splitter configured to adjust a direction in which the terahertz wave travels, the beam splitter being located in a position at which terahertz waves transmitted through the beam expander intersect, a beam diffuser configured to receive a terahertz wave from the beam splitter that receives a terahertz wave corresponding to the terahertz wave that travels in the adjusted direction and that is reflected from a sample, and configured to output a diffused terahertz wave, a telecentric f-θ lens configured to determine a focal point of the terahertz wave diffused by the beam diffuser, a beam scanner configured to transmit and scan the terahertz wave transmitted through the telecentric f-θ lens, and a beam detector configured to detect the terahertz wave transmitted through the beam scanner, to acquire an image of the sample.

The beam splitter may be configured to divide the direction in which the terahertz wave travels into a direction of a sample and a direction of the Michelson interferometer reference arm. The Michelson interferometer reference arm may be configured to adjust a depth of the sample from which the terahertz wave is reflected so that a depth image of the sample is acquired.

The Michelson interferometer reference arm may be configured to adjust, using at least one lens, a mirror and a stage, the depth of the sample from which the terahertz wave is reflected.

The apparatus may further include a lens located between the sample and the beam splitter. A direction in which the terahertz wave travels from the beam splitter to the sample may be changed by the lens so that beams with the terahertz wave are collimated.

According to another aspect, there is provided an apparatus for acquiring an image, the apparatus including a beam source configured to generate a terahertz wave, a beam expander configured to expand an angle of the terahertz wave output from the beam source, a lens configured to change a direction in which the terahertz wave transmitted through the beam expander travels so that beams with the terahertz wave are collimated, a beam splitter configured to adjust a direction in which the terahertz wave transmitted through the lens travels, a beam diffuser configured to receive a terahertz wave from the beam splitter that receives a terahertz wave corresponding to the terahertz wave that travels in the adjusted direction and that is reflected from a sample, and configured to output a diffused terahertz wave, a telecentric f-θ lens configured to determine a focal point of the terahertz wave diffused by the beam diffuser, a beam scanner configured to transmit and scan the terahertz wave transmitted through the telecentric f-θ lens, and a beam detector configured to detect the terahertz wave transmitted by the beam scanner, to acquire an image of the sample.

The beam splitter may be configured to divide the direction in which the terahertz wave travels into a direction of a sample and a direction of the Michelson interferometer reference arm. The Michelson interferometer may be configured to adjust a depth of the sample from which the terahertz wave is reflected so that a depth image of the sample is acquired.

The Michelson interferometer reference arm may be configured to adjust, using at least one mirror and a stage, the depth of the sample from which the terahertz wave is reflected.

The beam diffuser may be configured to receive the terahertz wave from the beam splitter using a plate, and to output a terahertz wave diffused by a nanoparticle and a structure that are included in the plate.

The beam detector may be configured to receive the terahertz wave reflected by the beam scanner using at least one lens and a mirror.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

The following structural or functional descriptions of example embodiments described herein are merely intended for the purpose of describing the example embodiments described herein and may be implemented in various forms. Here, the examples are not construed as limited to the disclosure and should be understood to include all changes, equivalents, and replacements within the idea and the technical scope of the disclosure.

Although terms of "first," "second," and the like are used to explain various components, the components are not limited to such terms. These terms are used only to distinguish one component from another component. For example, a first component may be referred to as a second component, or similarly, the second component may be referred to as the first component within the scope of the present disclosure.

When it is mentioned that one component is "connected" to another component, it may be understood that the one component is directly connected to another component or that still other component is interposed between the two components.

The terminology used herein is for the purpose of describing particular embodiments only and is not intended to be limiting. As used herein, the singular forms are intended to include the plural forms as well, unless the context clearly indicates otherwise. It will be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

Unless otherwise defined herein, all terms used herein including technical or scientific terms have the same meanings as those generally understood by one of ordinary skill in the art. Terms defined in dictionaries generally used should be construed to have meanings matching contextual meanings in the related art and are not to be construed as an ideal or excessively formal meaning unless otherwise defined herein.

Hereinafter, example embodiments will be described in detail with reference to the accompanying drawings.

Figure 1:
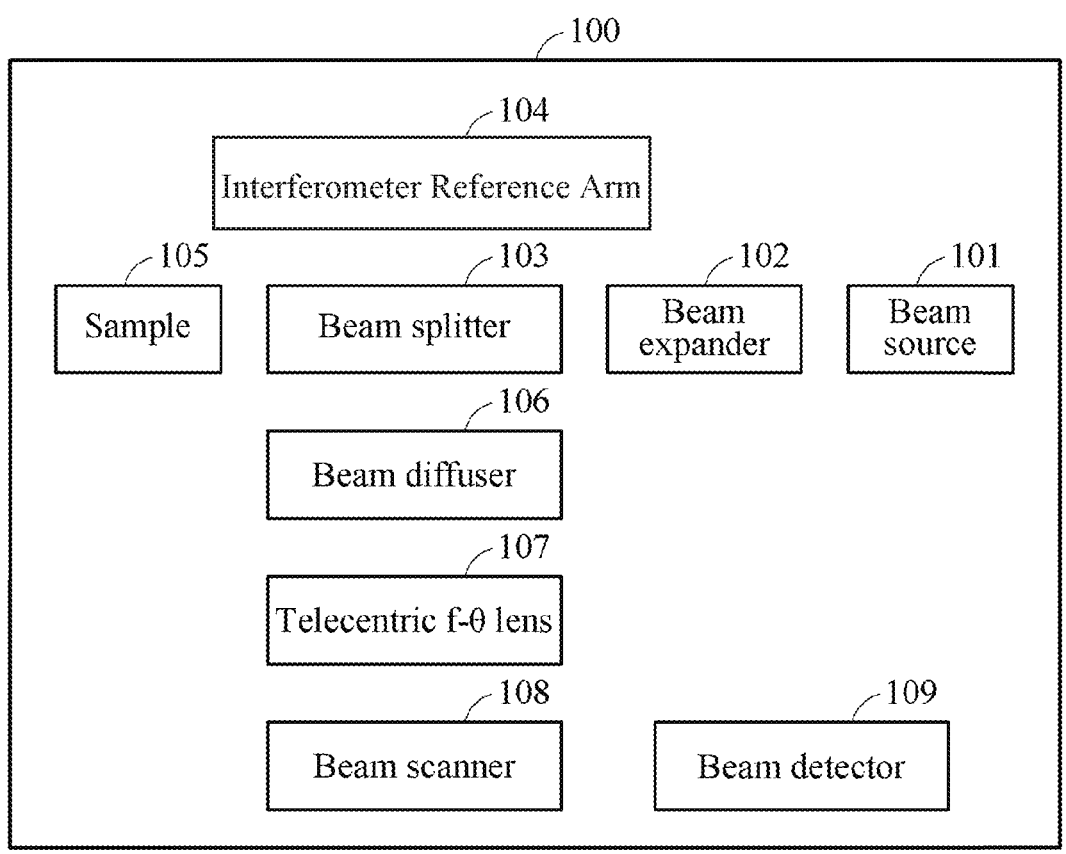
FIG. 1 is a diagram illustrating an example of an apparatus for acquiring an image of a sample using a terahertz wave according to an example embodiment.

FIG. 1 is a diagram illustrating an apparatus 100 for acquiring an image of a sample using a terahertz wave according to an example embodiment. In the present disclosure, an apparatus for acquiring an image of a sample using a terahertz wave may be referred to as an "image acquisition apparatus."

Referring to FIG. 1, the image acquisition apparatus 100 may include a beam source 101, a beam expander 102, a beam splitter 103, an interferometer reference arm 104, a sample 105, a beam diffuser 106, a telecentric f-η lens 107, a beam scanner 108, and a beam detector 109.

The beam source 101 may generate an electromagnetic wave. For example, the electromagnetic wave may include a terahertz wave in a band of frequencies of 0.1 terahertz (THz) to 10 THz. A terahertz wave output from the beam source 101 may be input to the beam expander 102, or may be reflected from a mirror and input to the beam expander 102.

The beam expander 102 may expand an angle of the received terahertz wave. For example, a radiation angle of a terahertz wave transmitted through a beam expander that includes at least one lens may be greater than a radiation angle of a terahertz wave generated by a beam source.

In an example, the terahertz wave transmitted through the beam expander 102 may be input to the beam splitter 103. In another example, the terahertz wave transmitted through the beam expander 102 may be transmitted through a lens and may be input to the beam splitter 103. The beam splitter 103 may adjust a direction in which the terahertz wave travels so that the terahertz wave may travel toward the interferometer reference arm 104 and the sample 105.

The interferometer reference arm 104 can adjust a depth of a sample from which a terahertz wave is reflected by an interferometer. Also, a terahertz wave may be input from the beam splitter 103 to the sample 105, or may be transmitted through a lens from the beam splitter 103 and input to the sample 105. A terahertz wave reflected from the sample 105 may include information about a depth image and a surface image of the sample 105.

The terahertz wave reflected from the sample 105 may be input back to the beam splitter 103. The beam splitter 103 may adjust a direction in which the terahertz wave travels so that the terahertz wave travels toward the beam diffuser 106.

The beam diffuser 106 may diffuse a received terahertz wave and may output the diffused terahertz wave to the telecentric f-θ lens 107. The terahertz wave may be diffused and output by a nanoparticle and a structure included in the beam diffuser 106.

The telecentric f-θ lens 107 may determine a focal point of the diffused terahertz wave. A terahertz wave transmitted through the telecentric f-θ lens 107 may be input to the beam scanner 108. The beam scanner 108 may reflect or transmit the terahertz wave.

Thus, the beam detector 109 may detect a terahertz wave reflected or transmitted from the beam scanner 108. The terahertz wave reflected or transmitted from the beam scanner 108 may be detected by the beam detector 109 using at least one lens and/or a mirror.

According to an example embodiment, the image acquisition apparatus 100 may adjust a depth of a terahertz wave reflected from a sample using the interferometer reference arm 104, to detect a terahertz wave including information about a depth image and a surface image of the sample. Also, the image acquisition apparatus 100 may detect, in real time, the information about the surface image and the depth image of the sample.

Figure 2:
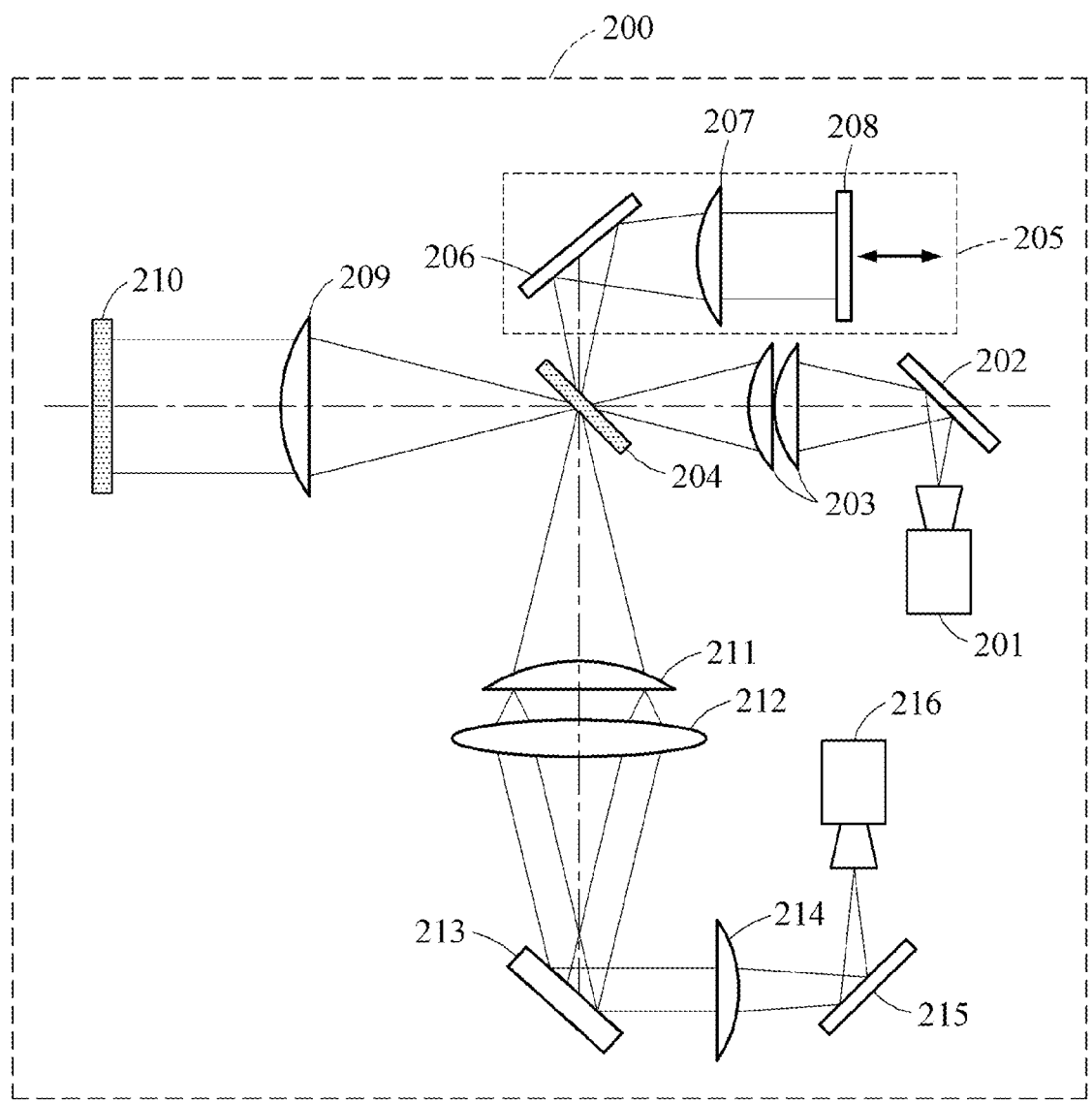
FIG. 2 is a diagram illustrating another example of an apparatus for acquiring an image of a sample using a terahertz wave according to an example embodiment.

FIG. 2 is a diagram illustrating an image acquisition apparatus 200 according to an example embodiment.

Referring to FIG. 2, the image acquisition apparatus 200 may include a beam source 201, a beam expander 203, a beam splitter 204, a Michelson interferometer reference arm 205, a sample 210, a beam diffuser 211, a telecentric f-θ lens 212, a beam scanner 213, and a beam detector 216.

The beam source 201 may generate an electromagnetic wave. For example, the electromagnetic wave may include a terahertz wave in a band of frequencies of 0.1 THz to 10 THz. The terahertz wave may have both a straightness and properties of penetrating a non-conductive material.

Also, unlike X-rays that ionize atoms or molecules of a material, a terahertz wave may have energy of about 4 megaelectron volt (meV), and have a non-ionization characteristic for preventing a material from being destroyed. Thus, the terahertz wave may not have an influence on human bodies, foods or materials even though the terahertz wave is propagated to human bodies, foods or materials, and accordingly may be used to acquire images of human bodies, foods or materials.

In an example, a terahertz wave generated by the beam source 201 may be input to the beam expander 203. In another example, the generated terahertz wave may be reflected from a first mirror 202 and may be input to the beam expander 203.

The beam expander 203 may expand an angle of the received terahertz wave. In an example, when a horn antenna is located in an output port of the beam source 201, a radiation angle of a terahertz wave output from the beam source 201 may range from 10 degrees to 11 degrees, and the beam expander 203 may be used to expand the radiation angle of the terahertz wave. In another example, when another antenna, instead of the horn antenna, is located in the port of the beam source 201, a radiation angle of a terahertz wave output from the beam source 201 may change.

For example, the beam expander 203 may include at least one lens. In this example, while the terahertz wave is transmitted through the at least one lens, the radiation angle may be expanded, and the beam expander 203 may be located so that the radiation angle of the terahertz wave may be expanded. For example, the beam expander 203 may include two lenses. The two lenses may allow terahertz waves to intersect, and accordingly radiation angles of the terahertz waves may be greater than the radiation angle of the terahertz wave output from the beam source 201 or a radiation angle of a terahertz wave reflected from the first mirror 202.

The beam splitter 204 may be located in a position at which terahertz waves transmitted through the beam expander 203 intersect. Since characteristics of reflection and/or transmission of terahertz waves change due to a difference in a refractive index of air and/or a material at an interface of the beam splitter 204, the beam splitter 204 may be used to divide a phase and an amplitude of a terahertz wave. Thus, the beam splitter 204 may adjust a direction in which a terahertz wave travels. For example, the beam splitter 204 may adjust a direction in which a terahertz wave travels so that the terahertz wave may travel toward the Michelson interferometer reference arm 205 and the sample 210.

The Michelson interferometer reference arm 205 may adjust, using at least one lens, a mirror and a stage, a depth of a sample from which a terahertz wave is reflected, so that a depth image of the sample may be acquired. The Michelson interferometer reference arm 205 may include a second mirror 206, a first lens 207, a third mirror 208 and a stage. A terahertz wave output from the beam splitter 204 may be reflected by the second mirror 206 and transmitted through the first lens 207, and a position at which a depth image is acquired from the sample may be adjusted by the third mirror 208 and the stage. Thus, the Michelson interferometer reference arm 205 may adjust the depth of the sample from which the terahertz wave is reflected, to acquire a depth image of the sample, instead of a surface image of the sample.

The third mirror 208 and the stage may control a reference position of an initially acquired image to be a surface of a sample. When the reference position of the initially acquired image is the surface of the sample, the third mirror 208 and the stage may control the reference position in a depth direction of the sample or in a direction opposite to the depth direction, to acquire the depth image of the sample. Example embodiments are not limited to the Michelson interferometer reference arm 205, and other interferometers with the same function may be used.

Also, a second lens 209 may be located between the sample 210 and the beam splitter 204. The second lens 209 may change a direction in which the terahertz wave output from the beam splitter 204 to the sample 210 travels so that beams with the terahertz wave may be collimated. The second lens 209 may adjust traveling directions of terahertz waves that are collimated and that are reflected from the sample 210 so that the terahertz waves may intersect in the beam splitter 204.

According to an example embodiment, a terahertz wave may be reflected from a sample and may include information about a depth image of the sample as well as a surface image of the sample. For example, a depth of the sample from which the terahertz wave is reflected may be adjusted using the Michelson interferometer reference arm, to acquire the depth image of the sample.

The beam splitter 204 may adjust a traveling direction of a terahertz wave reflected from the sample 210 and transmitted through the second lens 209 so that the terahertz wave may travel toward the beam diffuser 211. Thus, the beam diffuser 211 may receive a terahertz wave that includes information about a depth image and a surface image of the sample from the beam splitter 204. The beam diffuser 211 may output a diffused terahertz wave to the telecentric f-θ lens 212.

In an example, the beam diffuser 211 may adjust, using a lens, beams with the received terahertz wave to be collimated, and may output a terahertz wave diffused by a nanoparticle and a structure that are included in the lens. In another example, the beam diffuser 211 may adjust, using a lens, beams with the received terahertz wave to be collimated, the terahertz wave transmitted through the lens may be input to a plate, and the beam diffuser 211 may output a terahertz wave diffused by a nanoparticle and a structure that are included in the plate.

For example, the beam diffuser 211 may output a terahertz wave diffused similarly to a screen, which may indicate outputting of information about a depth image and a surface image of a sample diffused similarly to a screen.

The telecentric f-θ lens 212 may determine a focal point of a terahertz wave diffused by the beam diffuser 211. For example, when a terahertz wave is incident at an arbitrary angle on the telecentric f-θ lens 212, the telecentric f-θ lens 212 may form a terahertz wave to be perpendicular to a plane of a sample from an exit surface of the telecentric f-θ lens 212 to a set focal length. In this example, the telecentric f-θ lens 212 may be a passive lens that is focused at a determined distance.

The terahertz wave transmitted through the telecentric f-θ lens 212 may be input to the beam scanner 213 and may be reflected by the beam scanner 213. The beam scanner 213 may include, for example, a two-dimensional (2D) Galvano scanner, a 2D polygon scanner, or a 2D metastructure scanner. The beam scanner 313 may receive a terahertz wave including information about a depth image and a surface image of a sample from the telecentric f-θ lens 212, and may reflect and output the received terahertz wave.

The beam detector 216 may detect the terahertz wave reflected by the beam scanner 213, using at least one lens and a mirror. For example, the terahertz wave may be transmitted through a third lens 214, may be reflected from a fourth mirror 215 and may be detected by the beam detector 216.

In an example, the image acquisition apparatus 200 may acquire a depth image of the sample as well as a surface image of a sample using a terahertz wave reflected from the sample and using the Michelson interferometer reference arm, to acquire a three-dimensional (3D) image of the sample. In other words, the 3D image of the sample including the surface image and the depth image may be acquired using the Michelson interferometer reference arm, instead of moving the sample or the image acquisition apparatus 200.

In another example, the image acquisition apparatus 200 may acquire a depth image of a sample as well as a surface image of the sample in real time using a terahertz wave reflected from the sample, to acquire a 3D image of the sample in real time. Thus, the 3D image of the sample including the surface image and the depth image may be acquired in real time using the Michelson interferometer reference arm, instead of moving the sample or the image acquisition apparatus 200.

For example, an image signal irradiated to a sample and reflected back may be generated similar to a screen, using a surface diffuser in a terahertz band. In this example, an image signal diffused at each point of a surface of the surface diffuser may be finally collected using a beam scanning device, for example, a 2D Galvano scanner or a 2D metastructure scanner.

When a terahertz wave diffused by a surface diffuser reaches an incident surface of a telecentric f-θ lens, an exit surface of the telecentric f-θ lens may transfer collimated beams of a terahertz wave to a beam scanning device.

A function of each of components described above with reference to FIG. 2 may equally be applicable to FIGS. 1 through 5. Thus, the same functions of components shown in FIGS. 1 through 5 as those of FIG. 2 may be understood with reference to the description of FIG. 2.

Figure 3:
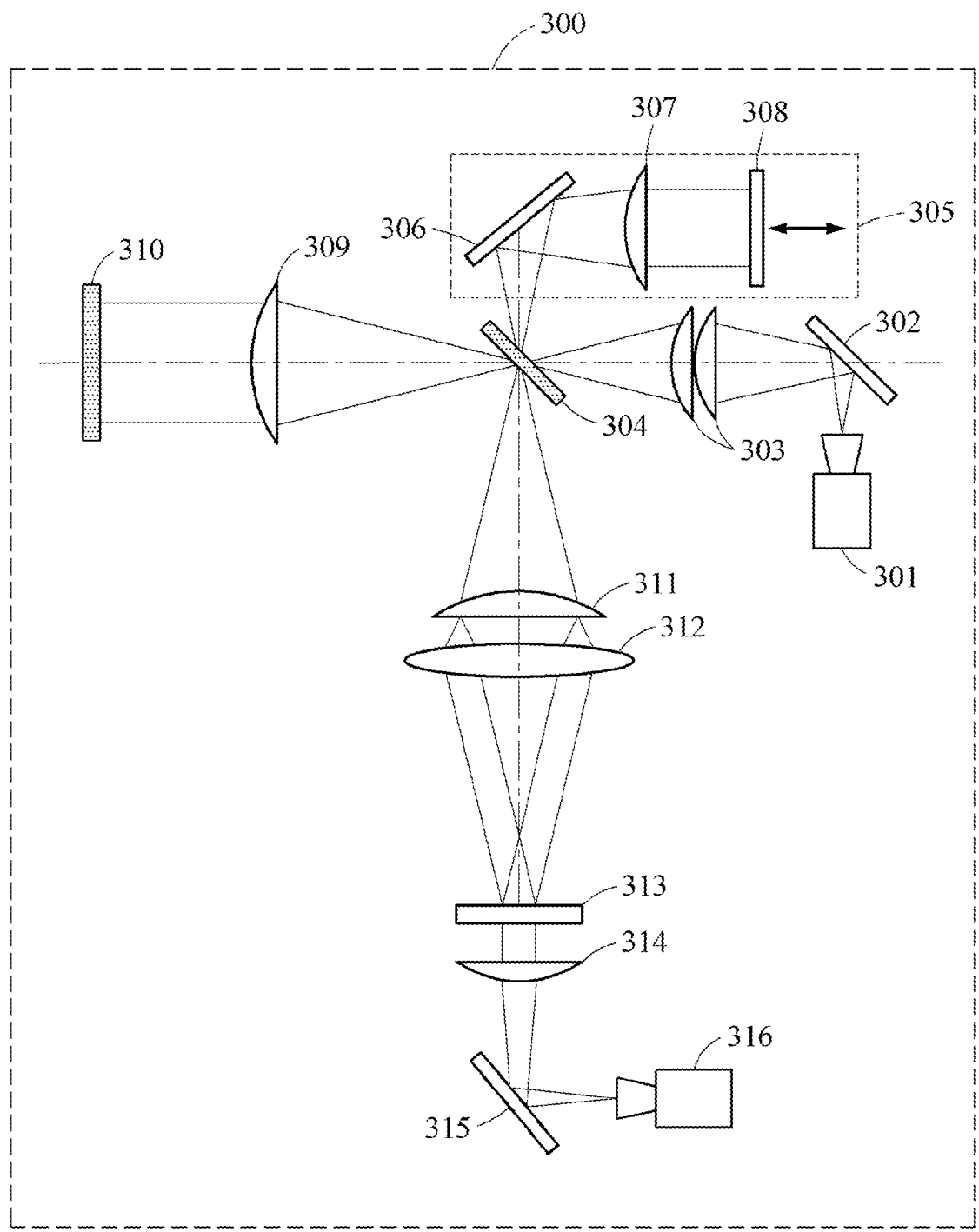
FIG. 3 is a diagram illustrating another example of an apparatus for acquiring an image of a sample using a terahertz wave according to an example embodiment.

FIG. 3 is a diagram illustrating an image acquisition apparatus 300 according to an example embodiment.

Referring to FIG. 3, the image acquisition apparatus 300 may include a beam source 301, a beam expander 303, a beam splitter 304, a Michelson interferometer reference arm 305, a sample 310, a beam diffuser 311, a telecentric f-θ lens 312, a beam scanner 313, and a beam detector 316.

The beam source 301 may generate an electromagnetic wave. For example, the electromagnetic wave may include a terahertz wave in a band of frequencies of 0.1 THz to 10 THz. The terahertz wave may have both a straightness and properties of penetrating a non-conductive material.

In an example, a terahertz wave generated by the beam source 301 may be input to the beam expander 303. In another example, the generated terahertz wave may be reflected from a first mirror 302 and may be input to the beam expander 303.

The beam expander 303 may expand an angle of the received terahertz wave. In an example, when a horn antenna is located in an output port of the beam source 301, a radiation angle of a terahertz wave output from the beam source 301 may range from 10 degrees to 11 degrees, and the beam expander 303 may be used to expand the radiation angle of the terahertz wave. In another example, when another antenna, instead of the horn antenna, is located in the output port of the beam source 301, a radiation angle of a terahertz wave output from the beam source 301 may change.

For example, the beam expander 303 may include at least one lens. In this example, while the terahertz wave is transmitted through the at least one lens, the radiation angle may be expanded, and the beam expander 303 may be located so that the radiation angle of the terahertz wave may be expanded. For example, the beam expander 303 may include two lenses. The two lenses may allow terahertz waves to intersect, and accordingly radiation angles of the terahertz waves may be greater than the radiation angle of the terahertz wave output from the beam source 301 or a radiation angle of a terahertz wave reflected from the first mirror 302.

The beam splitter 304 may be located in a position at which terahertz waves transmitted through the beam expander 303 intersect. Since characteristics of reflection and/or transmission of terahertz waves change due to a difference in a refractive index of air and/or a material at an interface of the beam splitter 304, the beam splitter 304 may be used to divide a phase and an amplitude of a terahertz wave. Thus, the beam splitter 304 may adjust a direction in which a terahertz wave travels. For example, the beam splitter 304 may adjust a direction in which a terahertz wave travels so that the terahertz wave may travel toward the Michelson interferometer reference arm 305 and the sample 310.

The Michelson interferometer reference arm 305 may adjust, using at least one lens, a mirror and a stage, a depth of a sample from which a terahertz wave is reflected, so that a depth image of the sample may be acquired. The Michelson interferometer reference arm 305 may include a second mirror 306, a first lens 307, a third mirror 308, and a stage. A terahertz wave output from the beam splitter 304 may be reflected by the second mirror 306 and transmitted through the first lens 307, and a position at which a depth image is acquired from the sample may be adjusted by the third mirror 308 and the stage. Thus, the Michelson interferometer reference arm 305 may adjust the depth of the sample from which the terahertz wave is reflected, to acquire a depth image of the sample, instead of a surface image of the sample.

The third mirror 308 and the stage may control a reference position of an initially acquired image to be a surface of a sample. When the reference position of the initially acquired image is the surface of the sample, the third mirror 308 and the stage may control the reference position in a depth direction of the sample or in a direction opposite to the depth direction, to acquire the depth image of the sample. Example embodiments are not limited to the Michelson interferometer reference arm 305, and other interferometers with the same function may be used.

Also, a second lens 309 may be located between the sample 310 and the beam splitter 304. The second lens 309 may change a direction in which the terahertz wave output from the beam splitter 304 to the sample 310 so that beams with the terahertz wave may be collimated. The second lens 309 may adjust traveling directions of terahertz waves that are collimated and that are reflected from the sample 310 so that beams with the terahertz waves may intersect in the beam splitter 304.

According to an example embodiment, a terahertz wave may be reflected from a sample and may include information about a depth image of the sample as well as a surface image of the sample. For example, a depth of the sample from which the terahertz wave is reflected may be adjusted using a Michelson interferometer reference arm, to acquire the depth image of the sample.

The beam splitter 304 may adjust a traveling direction of a terahertz wave reflected from the sample 310 and transmitted through the second lens 309 so that the terahertz wave may travel toward the beam diffuser 311. Thus, the beam diffuser 311 may receive a terahertz wave that includes information about a depth image and a surface image of the sample from the beam splitter 304. The beam diffuser 311 may output a diffused terahertz wave to the telecentric f-θ lens 312.

In an example, the beam diffuser 311 may adjust, using a lens, beams with the received terahertz wave to be collimated, and may output a terahertz wave diffused by a nanoparticle and a structure that are included in the lens. In another example, the beam diffuser 311 may adjust, using a lens, beams with the received terahertz wave to be collimated, the terahertz wave transmitted through the lens may be input to a plate, and the beam diffuser 311 may output a terahertz wave diffused by a nanoparticle and a structure that are included in the plate.

For example, the beam diffuser 311 may output a terahertz wave diffused similarly to a screen, which may indicate outputting of information about a depth image and a surface image of a sample diffused similarly to a screen.

The telecentric f-θ lens 312 may determine a focal point of a terahertz wave diffused by the beam diffuser 311. For example, when a terahertz wave is incident at an arbitrary angle on the telecentric f-θ lens 312, the telecentric f-θ lens 312 may form a terahertz wave to be perpendicular to a plane of a sample from an exit surface of the telecentric f-θ lens 312 to a set focal length. In this example, the telecentric f-θ lens 312 may be a passive lens that is focused at a determined distance.

The terahertz wave transmitted through the telecentric f-θ lens 312 may be input to the beam scanner 313 and may be transmitted through the beam scanner 313. The beam scanner 313 may include, for example, a 2D Galvano scanner, a 2D polygon scanner, or a 2D metastructure scanner. The beam scanner 313 may receive a terahertz wave including information about a depth image and a surface image of a sample from the telecentric f-θ lens 312, and may transmit and output the received terahertz wave.

The beam detector 316 may detect, using at least one lens and a mirror, a terahertz wave reflected from the beam scanner 313. For example, the terahertz wave may be transmitted through a third lens 314, may be reflected from a fourth mirror 315, and may be detected by the beam detector 316.

In an example, the image acquisition apparatus 300 may acquire a depth image of the sample as well as a surface image of a sample using a terahertz wave reflected from the sample and using a Michelson interferometer, to acquire a 3D image of the sample. In other words, the 3D image of the sample including the surface image and the depth image may be acquired using the Michelson interferometer reference arm, instead of moving the sample or the image acquisition apparatus 300.

In another example, the image acquisition apparatus 300 may acquire a depth image of a sample as well as a surface image of the sample in real time using a terahertz wave reflected from the sample, to acquire a 3D image of the sample in real time. Thus, the 3D image of the sample including the surface image and the depth image may be acquired in real time using the Michelson interferometer reference arm, instead of moving the sample or the image acquisition apparatus 300.

Figure 4:
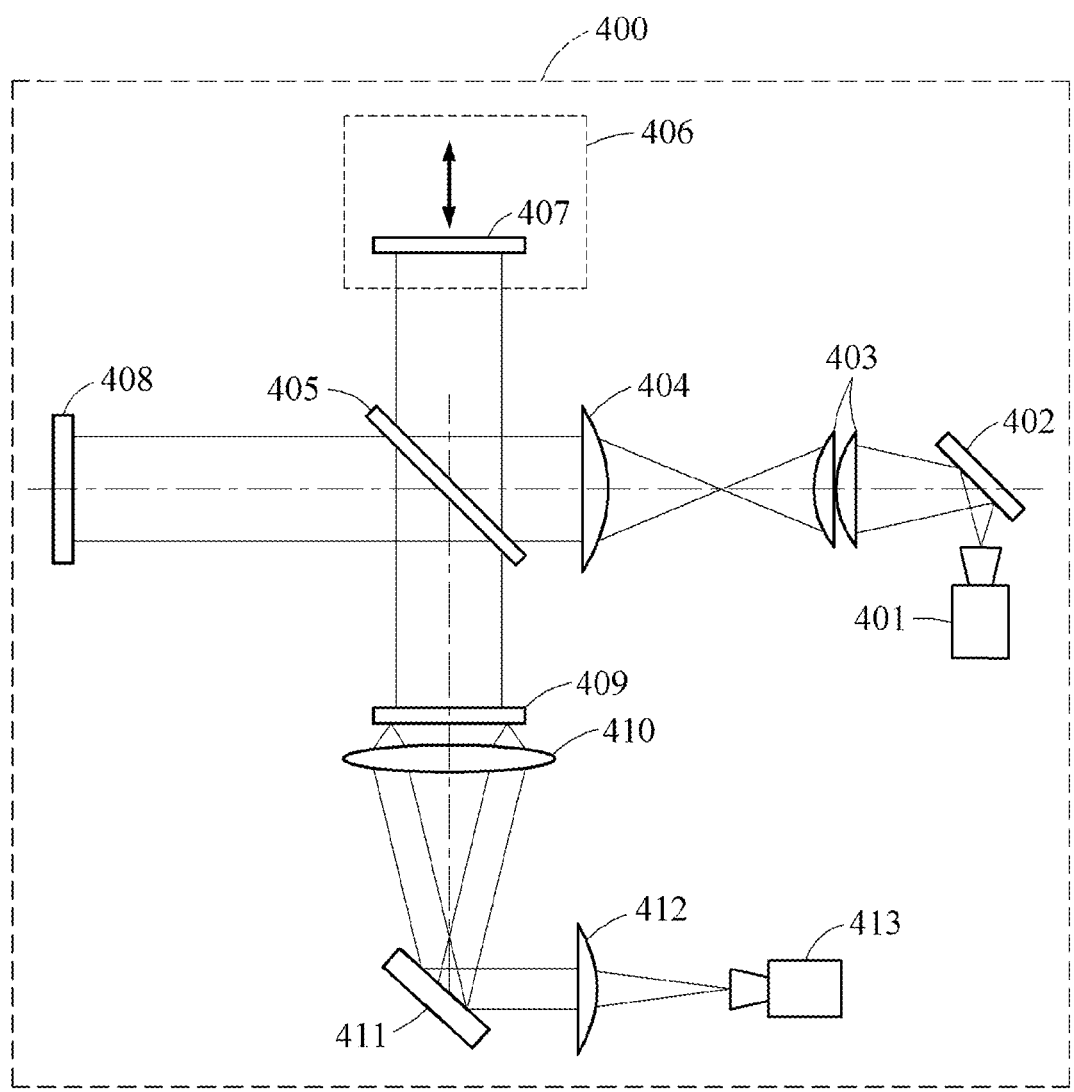
FIG. 4 is a diagram illustrating another example of an apparatus for acquiring an image of a sample using a terahertz wave according to an example embodiment.

FIG. 4 is a diagram illustrating an image acquisition apparatus 400 according to an example embodiment.

Referring to FIG. 4, the image acquisition apparatus 400 may include a beam source 401, a beam expander 403, a beam splitter 405, a Michelson interferometer reference arm 406, a sample 408, a beam diffuser 409, a telecentric f-θ lens 410, a beam scanner 411, and a beam detector 413.

The beam source 401 may generate an electromagnetic wave. For example, the electromagnetic wave may include a terahertz wave in a band of frequencies of 0.1 THz to 10 THz. The terahertz wave may have both a straightness and properties of penetrating a non-conductive material.

In an example, a terahertz wave generated by the beam source 401 may be input to the beam expander 403. In another example, the generated terahertz wave may be reflected from a first mirror 402 and may be input to the beam expander 403.

The beam expander 403 may expand an angle of the received terahertz wave. In an example, when a horn antenna is located in an output port of the beam source 401, a radiation angle of a terahertz wave output from the beam source 401 may range from 10 degrees to 11 degrees, and the beam expander 403 may be used to expand the radiation angle of the terahertz wave. In another example, when another antenna, instead of the horn antenna, is located in the output port of the beam source 401, a radiation angle of a terahertz wave output from the beam source 401 may change.

For example, the beam expander 403 may include at least one lens. In this example, while the terahertz wave is transmitted through the at least one lens, the radiation angle may be expanded, and the beam expander 403 may be located so that the radiation angle of the terahertz wave may be expanded. For example, the beam expander 403 may include two lenses. The two lenses may allow terahertz waves to intersect, and accordingly radiation angles of the terahertz waves may be greater than the radiation angle of the terahertz wave output from the beam source 401 or a radiation angle of a terahertz wave reflected from the first mirror 402.

Also, the radiation angles of the terahertz waves output from the beam expander 403 may be expanded while the terahertz waves intersect, and the terahertz waves with the expanded radiation angles may be input to a first lens 404. The first lens 404 may change traveling directions of the input terahertz waves so that beams with the terahertz waves may be collimated and may be transmitted through the first lens 404.

The terahertz waves transmitted through the first lens 404 may be input to the beam splitter 405. Since characteristics of reflection and/or transmission of terahertz waves change due to a difference in a refractive index of air and/or a material at an interface of the beam splitter 405, the beam splitter 405 may be used to divide a phase and an amplitude of a terahertz wave. Thus, the beam splitter 405 may adjust a direction in which a terahertz wave travels. For example, the beam splitter 405 may adjust a direction in which a terahertz wave travels so that the terahertz wave may travel toward the Michelson interferometer reference arm 406 and the sample 408.

The Michelson interferometer reference arm 406 may adjust a depth of a sample from which a terahertz wave is reflected, so that a depth image of the sample may be acquired. For example, the Michelson interferometer reference arm 406 may include a second mirror 407 and a stage. A terahertz wave output from the beam splitter 405 may be reflected by the second mirror 407, and a position at which a depth image is acquired from the sample may be adjusted by the second mirror 407 and the stage. Thus, the Michelson interferometer reference arm 406 may adjust the depth of the sample from which the terahertz wave is reflected, to acquire a depth image of the sample, instead of a surface image of the sample.

The second mirror 407 and the stage may control a reference position of an initially acquired image to be a surface of a sample. When the reference position of the initially acquired image is the surface of the sample, the second mirror 407 and the stage may control the reference position in a depth direction of the sample or in a direction opposite to the depth direction, to acquire the depth image of the sample. Example embodiments are not limited to the Michelson interferometer reference arm 406, and other interferometers with the same function may be used.

The sample 408 may receive collimated beams of a terahertz wave from the beam splitter 405. The collimated beams may be reflected from the sample 408 and may be output to be collimated. The output collimated beams may be input to the beam splitter 405.

According to an example embodiment, a terahertz wave may be reflected from a sample and may include information about a depth image of the sample as well as a surface image of the sample. For example, a depth of the sample from which the terahertz wave is reflected may be adjusted using a Michelson interferometer reference arm, to acquire the depth image of the sample.

The beam splitter 405 may adjust a terahertz wave reflected from the sample 408 so that beams with the terahertz wave may be collimated and travel to the beam diffuser 409. Thus, the beam diffuser 409 may receive a terahertz wave that includes information about a depth image and a surface image of the sample from the beam splitter 405. The beam diffuser 409 may output a diffused terahertz wave to the telecentric f-θ lens 410.

When the terahertz wave is received using a plate, the beam diffuser 409 may output a terahertz wave diffused by a nanoparticle and a structure that are included in the plate. The plate may be formed using liquid crystals.

For example, the beam diffuser 409 may output a terahertz wave diffused similarly to a screen, which may indicate outputting of information about a depth image and a surface image of a sample diffused similarly to a screen.

The telecentric f-θ lens 410 may determine a focal point of a terahertz wave diffused by the beam diffuser 409. For example, when a terahertz wave is incident at an arbitrary angle on the telecentric f-θ lens 410, the telecentric f-θ lens 410 may form a terahertz wave to be perpendicular to a plane of a sample from an exit surface of the telecentric f-θ lens 410 to a set focal length. In this example, the telecentric f-θ lens 410 may be a passive lens that is focused at a determined distance.

The terahertz wave transmitted through the telecentric f-θ lens 410 may be input to the beam scanner 411 and may be reflected by the beam scanner 411. The beam scanner 411 may include, for example, a 2D Galvano scanner, a 2D polygon scanner, or a 2D metastructure scanner. The beam scanner 411 may receive a terahertz wave including information about a depth image and a surface image of a sample from the telecentric f-θ lens 410, and may reflect and output the received terahertz wave.

The beam detector, 413 may detect, using at least one lens, a terahertz wave reflected from the beam scanner 411. For example, the terahertz wave may be transmitted through a second lens 412, and may be detected by the beam detector 413.

In an example, the image acquisition apparatus 400 may acquire a depth image of the sample as well as a surface image of a sample using a terahertz wave reflected from the sample and using a Michelson interferometer reference arm, to acquire a 3D image of the sample. In other words, the 3D image of the sample including the surface image and the depth image may be acquired using the Michelson interferometer reference arm, instead of moving the sample or the image acquisition apparatus 400.

In another example, the image acquisition apparatus 400 may acquire a depth image of a sample as well as a surface image of the sample in real time using a terahertz wave reflected from the sample, to acquire a 3D image of the sample in real time. Thus, the 3D image of the sample including the surface image and the depth image may be acquired in real time using the Michelson interferometer reference arm, instead of moving the sample or the image acquisition apparatus 400.

Figure 5:
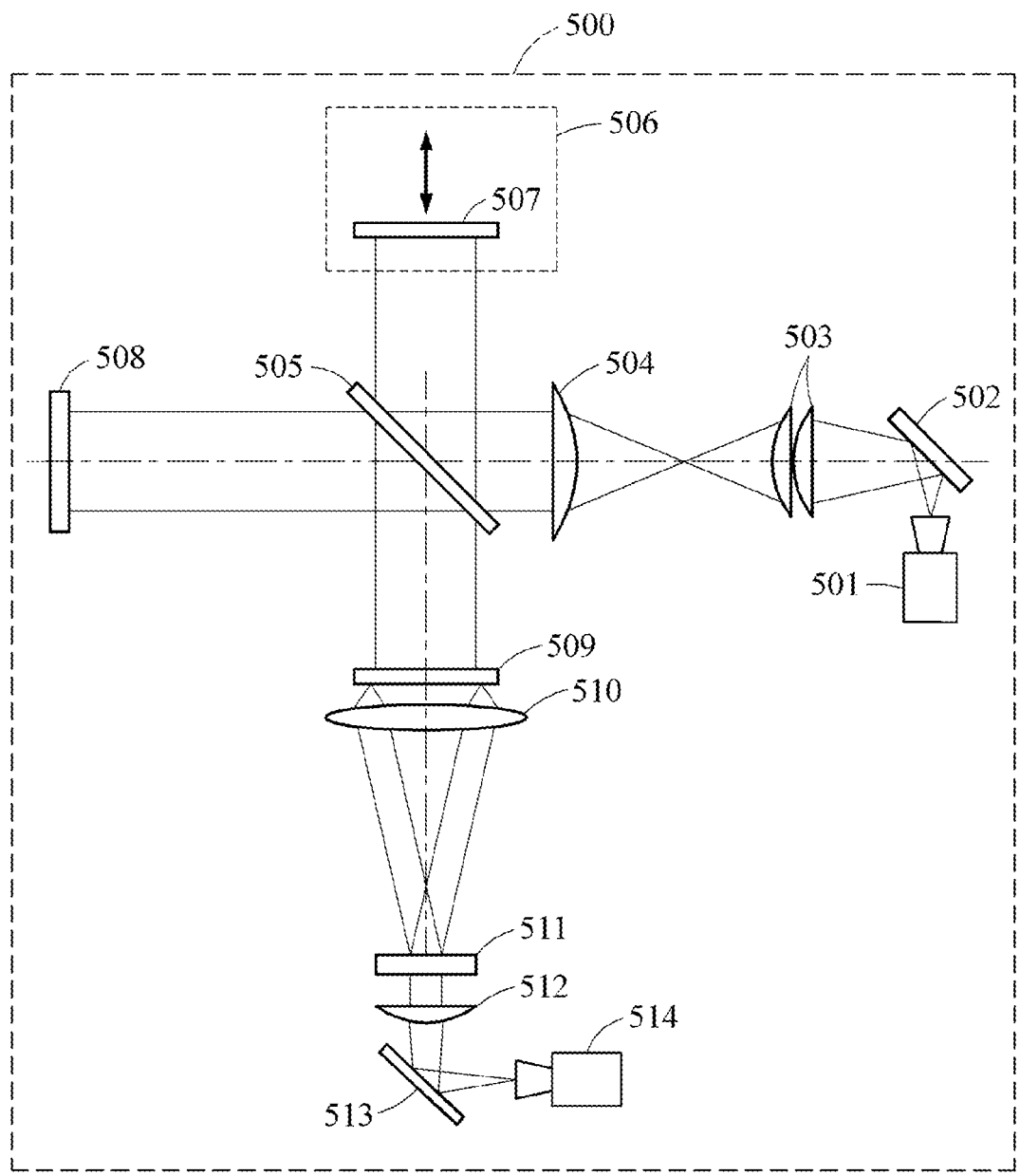
FIG. 5 is a diagram illustrating another example of an apparatus for acquiring an image of a sample using a terahertz wave according to an example embodiment.

FIG. 5 is a diagram illustrating an image acquisition apparatus 500 according to an example embodiment.

Referring to FIG. 5, the image acquisition apparatus 500 may include a beam source 501, a beam expander 503, a beam splitter 505, a Michelson interferometer reference arm 506, a sample 508, a beam diffuser 509, a telecentric f-θ lens 510, a beam scanner 511, and a beam detector 514.

The beam source 501 may generate an electromagnetic wave. For example, the electromagnetic wave may include a terahertz wave in a band of frequencies of 0.1 THz to 10 THz. The terahertz wave may have both a straightness and properties of penetrating a non-conductive material.

In an example, a terahertz wave generated by the beam source 501 may be input to the beam expander 503. In another example, the generated terahertz wave may be reflected from a first mirror 502 and may be input to the beam expander 503.

The beam expander 503 may expand an angle of the received terahertz wave. In an example, when a horn antenna is located in an output port of the beam source 501, a radiation angle of a terahertz wave output from the beam source 501 may range from 10 degrees to 11 degrees, and the beam expander 503 may be used to expand the radiation angle of the terahertz wave. In another example, when another antenna, instead of the horn antenna, is located in the output port of the beam source 501, a radiation angle of a terahertz wave output from the beam source 501 may change.

For example, the beam expander 503 may include at least one lens. In this example, while the terahertz wave is transmitted through the at least one lens, the radiation angle may be expanded, and the beam expander 503 may be located so that the radiation angle of the terahertz wave may be expanded. For example, the beam expander 503 may include two lenses. The two lenses may allow terahertz waves to intersect, and accordingly radiation angles of the terahertz waves may be greater than the radiation angle of the terahertz wave output from the beam source 501 or a radiation angle of a terahertz wave reflected from the first mirror 502.

Also, the radiation angles of the terahertz waves output from the beam expander 503 may be expanded while the terahertz waves intersect, and the terahertz waves with the expanded radiation angles may be input to a first lens 504. The first lens 504 may change traveling directions of the input terahertz waves so that beams with the terahertz waves may be collimated and may be transmitted through the first lens 504.

The terahertz waves transmitted through the first lens 504 may be input to the beam splitter 505. Since characteristics of reflection and/or transmission of terahertz waves change due to a difference in a refractive index of air and/or a material at an interface of the beam splitter 505, the beam splitter 505 may be used to divide a phase and an amplitude of a terahertz wave. Thus, the beam splitter 505 may adjust a direction in which a terahertz wave travels. For example, the beam splitter 505 may adjust a direction in which a terahertz wave travels so that the terahertz wave may travel toward the Michelson interferometer reference arm 506 and the sample 508.

The Michelson interferometer reference arm 506 may adjust a depth of a sample from which a terahertz wave is reflected, so that a depth image of the sample may be acquired. The Michelson interferometer reference arm 506 may include a second mirror 507 and a stage. A terahertz wave output from the beam splitter 505 may be reflected by the second mirror 507, and a position at which a depth image is acquired from the sample may be adjusted by the second mirror 507 and the stage. Thus, the Michelson interferometer reference arm 506 may adjust the depth of the sample from which the terahertz wave is reflected, to acquire a depth image of the sample, instead of a surface image of the sample.

The second mirror 507 and the stage may control a reference position of an initially acquired image to be a surface of a sample. When the reference position of the initially acquired image is the surface of the sample, the second mirror 507 and the stage may control the reference position in a depth direction of the sample or in a direction opposite to the depth direction, to acquire the depth image of the sample. Example embodiments are not limited to the Michelson interferometer reference arm 506, and other interferometers with the same function may be used.

The sample 508 may receive collimated beams of a terahertz wave from the beam splitter 505. The collimated beams may be reflected from the sample 508 and may be output to be collimated. The output collimated beams may be input to the beam splitter 505.

According to an example embodiment, a terahertz wave may be reflected from a sample and may include information about a depth image of the sample as well as a surface image of the sample. For example, a depth of the sample from which the terahertz wave is reflected may be adjusted using the Michelson interferometer reference arm, to acquire the depth image of the sample.

The beam splitter 505 may adjust a terahertz wave reflected from the sample 508 so that beams with the terahertz wave may be collimated and travel to the beam diffuser 509. Thus, the beam diffuser 509 may receive a terahertz wave that includes information about a depth image and a surface image of the sample from the beam splitter 505. The beam diffuser 509 may output a diffused terahertz wave to the telecentric f-θ lens 510.

When the terahertz wave is received using a plate, the beam diffuser 509 may output a terahertz wave diffused by a nanoparticle and a structure that are included in the plate. The plate may be formed using liquid crystals.

For example, the beam diffuser 509 may output a terahertz wave diffused similarly to a screen, which may indicate outputting of information about a depth image and a surface image of a sample diffused similarly to a screen.

The telecentric f-θ lens 510 may determine a focal point of a terahertz wave diffused by the beam diffuser 509. For example, when a terahertz wave is incident at an arbitrary angle on the telecentric f-θ lens 510, the telecentric f-θ lens 510 may form a terahertz wave to be perpendicular to a plane of a sample from an exit surface of the telecentric f-θ lens 510 to a set focal length. In this example, the telecentric f-θ lens 510 may be a passive lens that is focused at a determined distance.

The terahertz wave transmitted through the telecentric f-θ lens 510 may be input to the beam scanner 511 and may be transmitted through the beam scanner 511. The beam scanner 511 may include, for example, a 2D Galvano scanner, a 2D polygon scanner, or a 2D metastructure scanner. The beam scanner 511 may receive a terahertz wave including information about a depth image and a surface image of a sample from the telecentric f-θ lens 510, and may transmit and output the received terahertz wave.

The beam detector 514 may detect, using at least one lens and a mirror, a terahertz wave reflected from the beam scanner 511. For example, the terahertz wave may be transmitted through a second lens 512, may be reflected from a third mirror 513, and may be detected by the beam detector 514.

In an example, the image acquisition apparatus 500 may acquire a depth image of the sample as well as a surface image of a sample using a terahertz wave reflected from the sample and using the Michelson interferometer reference arm, to acquire a 3D image of the sample. In other words, the 3D image of the sample including the surface image and the depth image may be acquired using the Michelson interferometer reference arm, instead of moving the sample or the image acquisition apparatus 500.

In another example, the image acquisition apparatus 500 may acquire a depth image of a sample as well as a surface image of the sample in real time using a terahertz wave reflected from the sample, to acquire a 3D image of the sample in real time. Thus, the 3D image of the sample including the surface image and the depth image may be acquired in real time using the Michelson interferometer reference arm, instead of moving the sample or the image acquisition apparatus 500.

Figure 6:
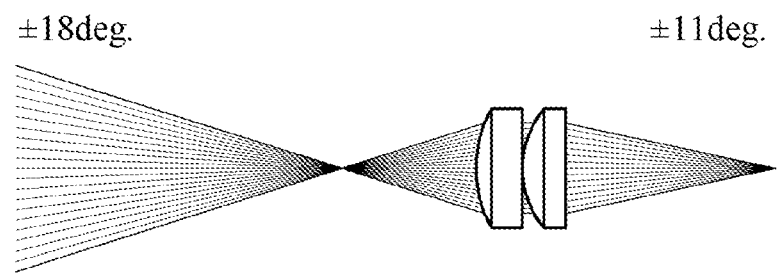
FIG. 6 is a diagram illustrating a beam expander according to an example embodiment.

FIG. 6 is a diagram illustrating a beam expander according to an example embodiment.

The beam expander may expand a radiation angle of a terahertz wave. For example, when a terahertz wave with a radiation angle of 10 degrees to 11 degrees is transmitted through the beam expander, the radiation angle may be expanded to 18 degrees.

The beam expander may include at least one lens. For example, the beam expander may include two lenses. In this example, when a terahertz wave with a radiation angle of 11 degrees is input, a traveling direction of the terahertz wave may be changed by the lenses so that beams with the terahertz wave may be collimated. Also, the traveling direction of the terahertz wave may be changed by refractive indices of the lenses, and accordingly beams with the terahertz waves may intersect. When the beams with the terahertz waves intersect by the lenses, the radiation angle of the terahertz wave may be expanded.

Figure 7A:
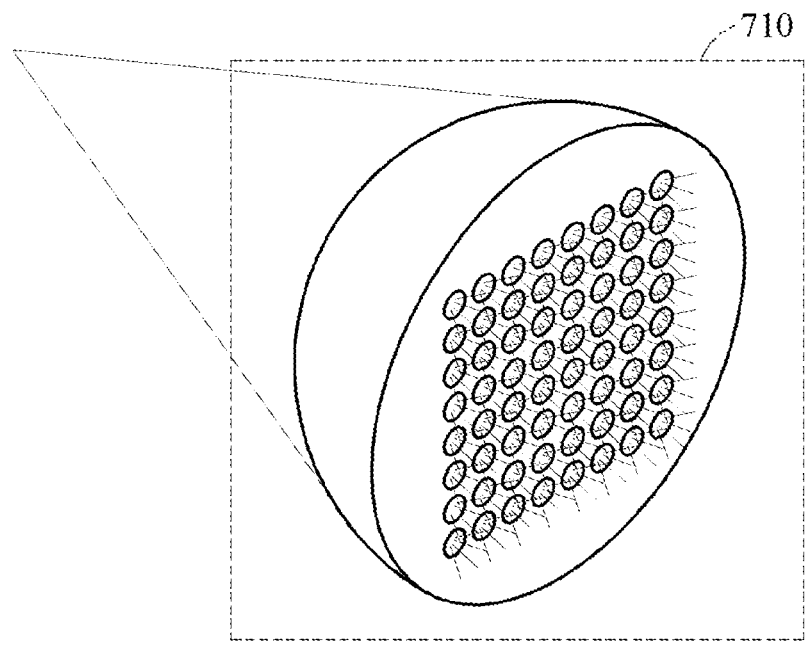
FIGS. 7A, 7B and 7C are diagrams illustrating examples of a beam diffuser according to an example embodiment.
Figure 7B:
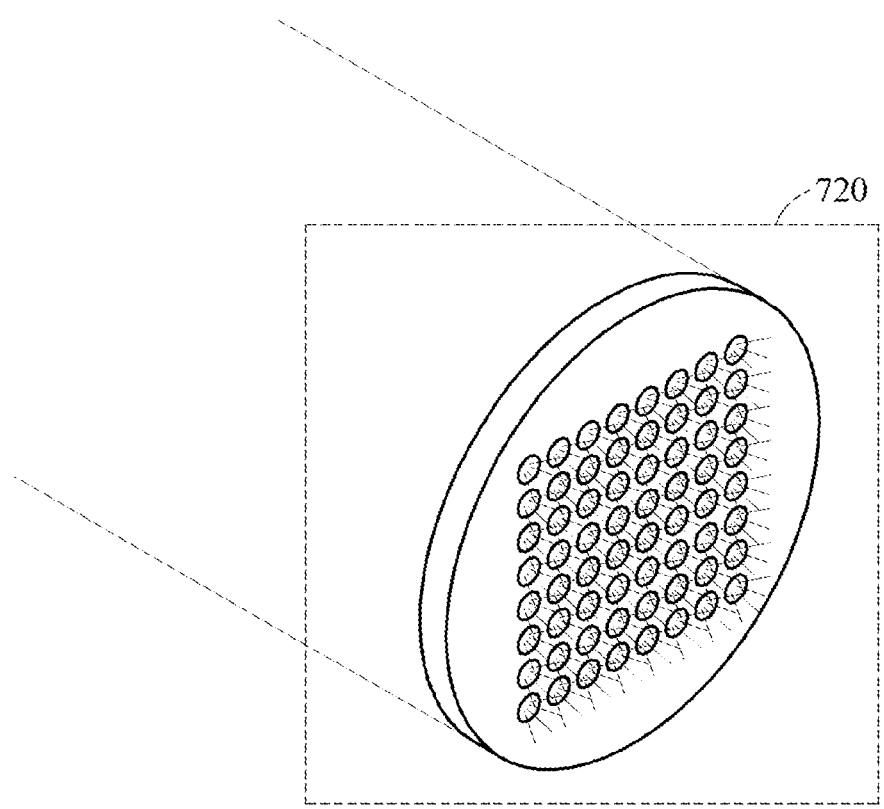
Figure 7C:
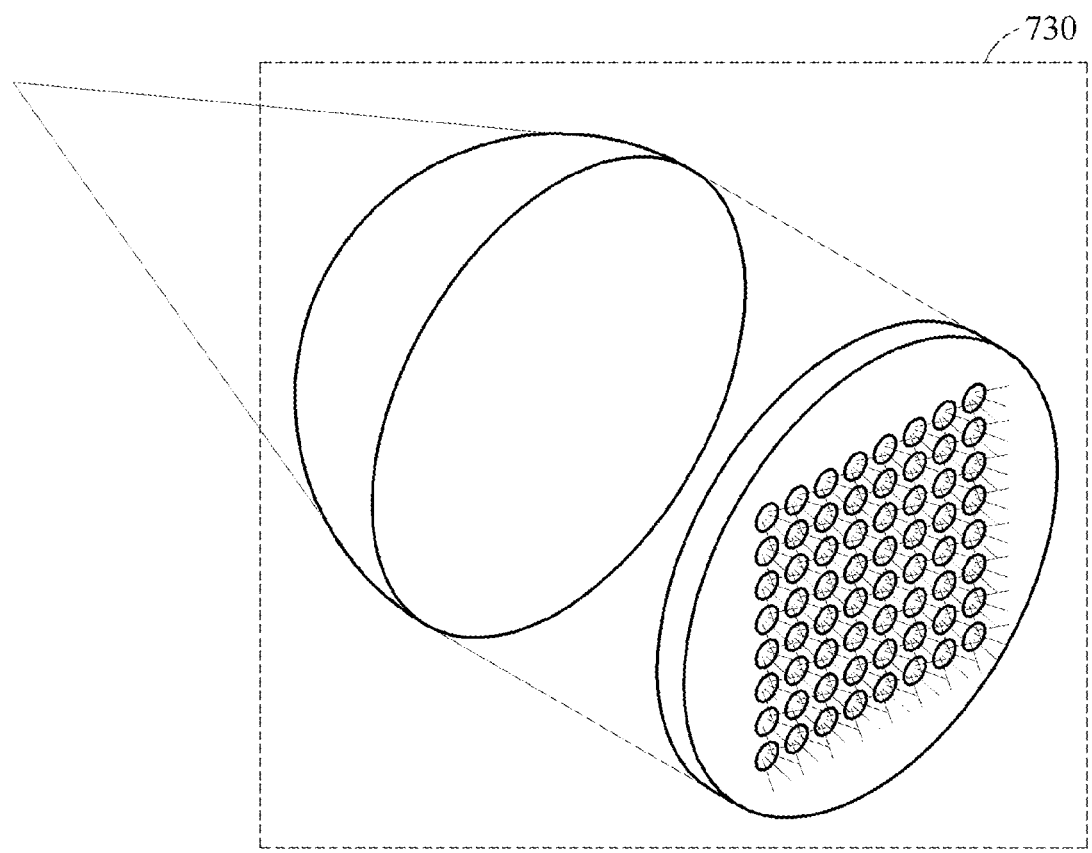

FIGS. 7A, 7B and 7C are diagrams illustrating examples of a beam diffuser according to an example embodiment.

FIG. 7A illustrates a beam diffuser 710 that uses a lens. The beam diffuser 710 may receive a terahertz wave radiated from a beam splitter. The beam diffuser 710 may change, using one surface of the lens, a direction of the radiated terahertz wave so that beams with the terahertz wave may be collimated. Also, the beam diffuser 710 may output a terahertz wave diffused on another surface of the lens by a periodic structure and a nanoparticle included in the lens.

FIG. 7B illustrates a beam diffuser 720 that uses a plate. The beam diffuser 720 may receive collimated beams of a terahertz wave from a beam splitter. The beam diffuser 720 may receive the collimated beams on one surface of the plate, and may output a terahertz wave diffused on another surface of the plate by a periodic structure and a nanoparticle included in the plate.

FIG. 7C illustrates a beam diffuser 730 that uses a lens and a plate. The beam diffuser 730 may receive a terahertz wave radiated from a beam splitter. The beam diffuser 730 may change, using one surface of the lens, a direction of the radiated terahertz wave so that beams with the terahertz wave may be collimated, and may output the collimated beams using another surface of the lens. The beam diffuser 730 may receive the collimated beams on one surface of the plate from the lens and may output a terahertz wave diffused on another surface of the plate by a periodic structure and a nanoparticle included in the plate.

Figure 8:
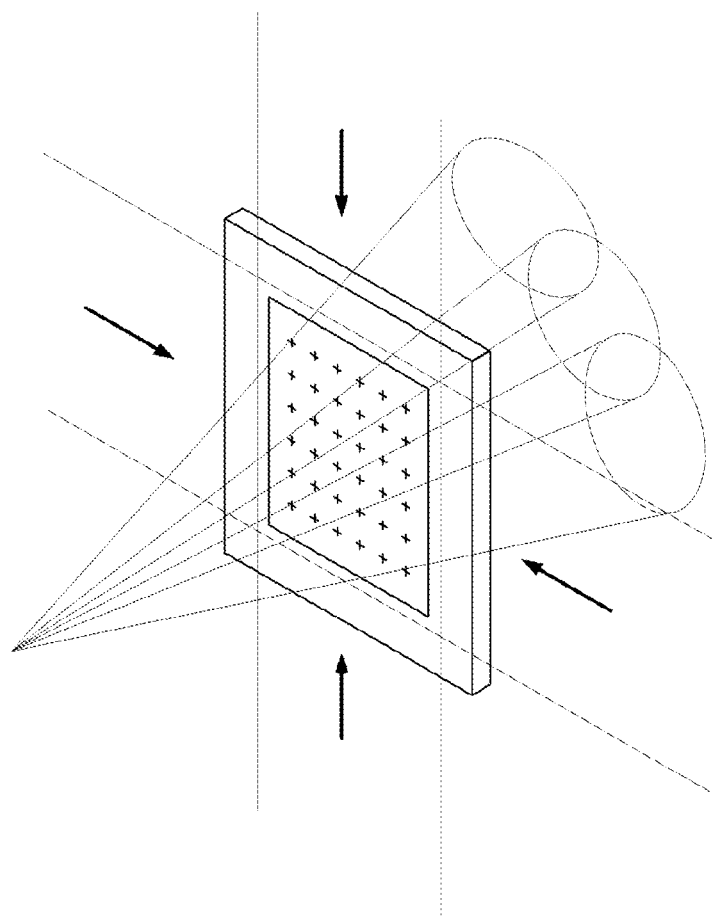
FIG. 8 is a diagram illustrating a two-dimensional (2D) metastructure scanner according to an example embodiment.

FIG. 8 is a diagram illustrating a 2D metastructure scanner according to an example embodiment.

The 2D metastructure scanner may be an example of a beam scanner. The 2D metastructure scanner may generate a 2D array structure and a pattern of each cell based on a resonant frequency, and may control a permittivity of each cell by an external voltage and/or an external current bias. Thus, the 2D metastructure scanner may freely change a direction of an incident terahertz wave by a combination of cells having a 2D array structure, and may output the terahertz wave.

Figure 9:
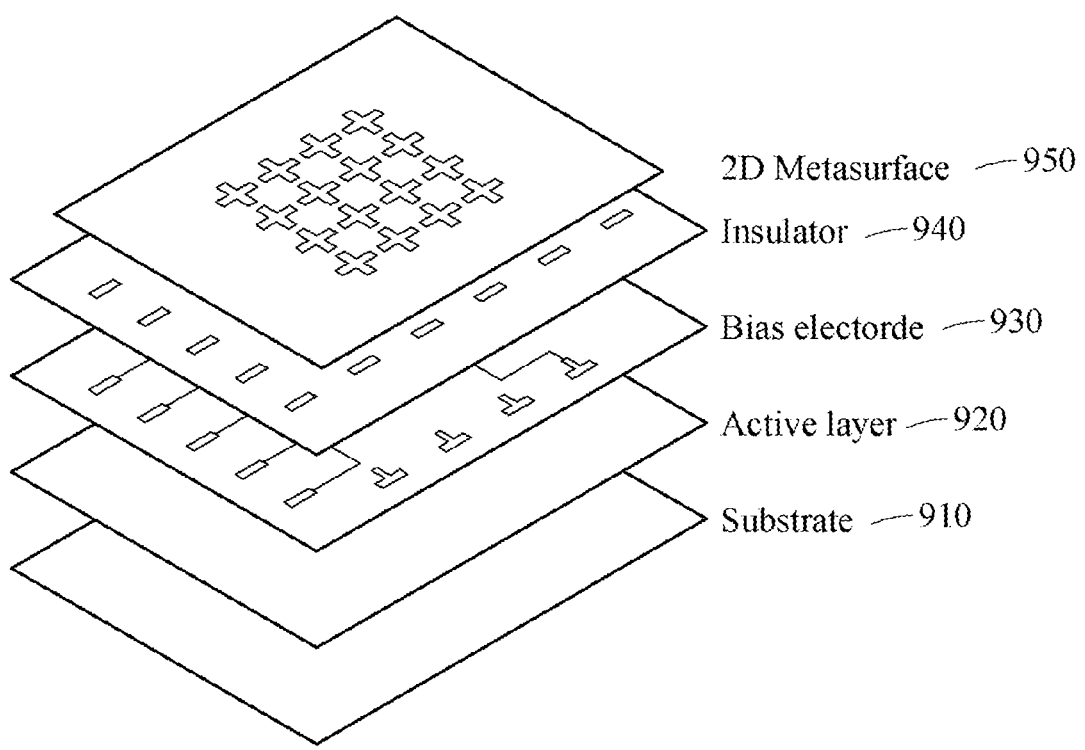
FIG. 9 is a diagram illustrating a process of manufacturing a 2D metastructure scanner according to an example embodiment.

FIG. 9 is a diagram illustrating a process of manufacturing a 2D metastructure scanner according to an example embodiment.

A substrate 910 may be formed of a material such as silicon or sapphire ($Al_2O_3$). An active layer 920 may be deposited and patterned on the substrate 910. A rate of change in a permittivity of the active layer 920 may increase by an external voltage and/or an external current bias. A bias electrode 930 of a voltage and/or a current may be deposited and patterned on the active layer 920. An insulator 940 may be deposited and patterned on the bias electrode 930. A 2D metasurface 950 may be deposited and patterned on the insulator 940.

According to example embodiments, it is possible to acquire a depth image and a surface image of a sample using a terahertz wave that does not have an influence on the sample.

According to example embodiments, it is possible to acquire a depth image of a sample from which a terahertz wave is reflected, by adjusting a depth of the sample using a Michelson interferometer.

According to example embodiments, it is possible to acquire a depth image of a sample from which a terahertz wave is reflected, by adjusting a depth of the sample using a Michelson interferometer reference arm.

The components described in the example embodiments may be implemented by hardware components including, for example, at least one digital signal processor (DSP), a processor, a controller, an application-specific integrated circuit (ASIC), a programmable logic element, such as a field programmable gate array (FPGA), other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

The apparatuses, and other components described herein may be implemented using a hardware component, a software component and/or a combination thereof. A processing device may be implemented using one or more general-purpose or special purpose computers, such as, for example, a processor, a controller and an arithmetic logic unit (ALU), a DSP, a microcomputer, an FPGA, a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An apparatus for acquiring an image, the apparatus comprising:
    a beam source configured to generate a terahertz wave;
    a beam expander configured to expand an angle of the terahertz wave output from the beam source;
    a beam splitter configured to adjust a direction in which the terahertz wave travels, the beam splitter being located in a position at which terahertz waves transmitted through the beam expander intersect;
    a beam diffuser configured to receive a terahertz wave from the beam splitter that receives a terahertz wave corresponding to the terahertz wave that travels in the adjusted direction and that is reflected from a sample, and configured to output a diffused terahertz wave;
    a telecentric f-θ lens configured to determine a focal point of the terahertz wave diffused by the beam diffuser;
    a beam scanner configured to reflect and scan the terahertz wave transmitted through the telecentric f-θ lens; and
    a beam detector configured to detect the terahertz wave reflected by the beam scanner, to acquire an image of the sample.

2. The apparatus of claim 1, wherein the beam splitter is configured to divide the direction in which the terahertz wave travels into a direction of a sample and a direction of a reference arm of an interferometer, wherein the reference arm of the interferometer is configured to adjust a depth of the sample from which the terahertz wave is reflected so that a depth image of the sample is acquired.

3. The apparatus of claim 2, wherein the reference arm of the interferometer is configured to adjust, using at least one lens, a mirror and a stage, the depth of the sample from which the terahertz wave is reflected.

4. The apparatus of claim 1, wherein the beam diffuser is configured to adjust, using a lens, beams with the received terahertz wave to be collimated, and to output a terahertz wave diffused by a nanoparticle and a structure that are included in the lens.

5. The apparatus of claim 1, further comprising: a lens located between the sample and the beam splitter, wherein a direction in which the terahertz wave travels from the beam splitter to the sample is changed by the lens so that beams with the terahertz wave are collimated.

6. An apparatus for acquiring an image, the apparatus comprising:
a beam source configured to generate a terahertz wave;
a beam expander configured to expand an angle of the terahertz wave output from the beam source;
a lens configured to change a direction in which the terahertz wave transmitted through the beam expander travels so that beams with the terahertz wave are collimated;
a beam splitter configured to adjust a direction in which the terahertz wave transmitted through the lens travels;
a beam diffuser configured to receive a terahertz wave from the beam splitter that receives a terahertz wave corresponding to the terahertz wave that travels in the adjusted direction and that is reflected from a sample, and configured to output a diffused terahertz wave;
a telecentric f-θ lens configured to determine a focal point of the terahertz wave diffused by the beam diffuser;
a beam scanner configured to reflect and scan the terahertz wave transmitted through the telecentric f-θ lens; and
a beam detector configured to detect the terahertz wave reflected by the beam scanner, to acquire an image of the sample.

7. The apparatus of claim 6, wherein the beam splitter is configured to divide the direction in which the terahertz wave travels into a direction of a sample and a direction of a reference arm of an interferometer, wherein the reference arm of the interferometer is configured to adjust a depth of the sample from which the terahertz wave is reflected so that a depth image of the sample is acquired.

8. The apparatus of claim 7, wherein the reference arm of the interferometer is configured to adjust, using at least one mirror and a stage, the depth of the sample from which the terahertz wave is reflected.

9. The apparatus of claim 6, wherein the beam diffuser is configured to receive the terahertz wave from the beam splitter using a plate, and to output a terahertz wave diffused by a nanoparticle and a structure that are included in the plate.

10. The apparatus of claim 6, wherein the beam detector is configured to receive, using at least one lens, the terahertz wave reflected by the beam scanner.

11. An apparatus for acquiring an image, the apparatus comprising:
a beam source configured to generate a terahertz wave;
a beam expander configured to expand an angle of the terahertz wave output from the beam source;
a beam splitter configured to adjust a direction in which the terahertz wave travels, the beam splitter being located in a position at which terahertz waves transmitted through the beam expander intersect;
a beam diffuser configured to receive a terahertz wave from the beam splitter that receives a terahertz wave corresponding to the terahertz wave that travels in the adjusted direction and that is reflected from a sample, and configured to output a diffused terahertz wave;
a telecentric f-θ lens configured to determine a focal point of the terahertz wave diffused by the beam diffuser;
a beam scanner configured to transmit and scan the terahertz wave transmitted through the telecentric f-θ lens; and
a beam detector configured to detect the terahertz wave transmitted through the beam scanner, to acquire an image of the sample.

12. The apparatus of claim 11, wherein the beam splitter is configured to divide the direction in which the terahertz wave travels into a direction of a sample and a direction of a reference arm of an interferometer, wherein the reference arm of the interferometer is configured to adjust a depth of the sample from which the terahertz wave is reflected so that a depth image of the sample is acquired.

13. The apparatus of claim 12, wherein the reference arm of the interferometer is configured to adjust, using at least one lens, a mirror and a stage, the depth of the sample from which the terahertz wave is reflected.

14. The apparatus of claim 11, wherein the beam diffuser is configured to adjust, using a lens, beams with the received terahertz wave to be collimated, and to output a terahertz wave diffused by a nanoparticle and a structure that are included in the lens.

15. The apparatus of claim 11, further comprising:
a lens located between the sample and the beam splitter, wherein a direction in which the terahertz wave travels from the beam splitter to the sample is changed by the lens so that beams with the terahertz wave are collimated.

* * * * *